Patented July 29, 1930

1,771,494

UNITED STATES PATENT OFFICE

THEODORE KRUMM, OF REDLANDS, CALIFORNIA

FERTILIZER

No Drawing.    Application filed March 14, 1928.  Serial No. 261,702.

This invention is a fertilizer particularly adapted for orange groves, lawns and flowers.

An object of the invention is to produce a fertilizer that will supply all the elements ordinarily poor in soils, to cause orange groves and the grass and flowers of lawns to grow more vigorously.

It is important that most of the ingredients be supplied from the by-products of animal life or vegetable matter such as tankage, fish, cotton seed meal, etc.

A suitable composition for my fertilizer and one that I have found most effective, is as follows:

|  | Per cent |
|---|---|
| Nitrate of lime or sulphate of ammonia, about | 20 |
| Blood meal, about | 5 |
| Tankage, about | 5 |
| Fish meal, about | 5 |
| Cotton seed meal, about | 5 |
| Tobacco, about | 2½ |
| Sulphate of potash, about | 5 |
| Steamed bone meal, about | 10 |
| Goat or sheep guano, about | 39½ |
| Sulphur, about | 1 |
| Sulphate of iron, about | 1 |
| Sulphate of copper, about | 1 |

The tobacco included in the above ingredients is a particularly active agent as to the insect known as "nematora", an insect which is found in the soil and which feeds on the roots of both trees and plants, with the resultant destruction.

The sulphur included in the above list in the preferred amount, is likewise a particularly active agent toward riddance of the insects known as 'thrip", ants, and the "red spider", all of which are destructive, either in themselves or through the larvæ which develop from the eggs laid on both trees and plants.

While I have given what seems to be about the proper proportions of these materials, these proportions may be considerably varied but should be kept in the proper proportions to produce a fertilizer having about the following analysis:

|  | Per cent |
|---|---|
| Nitrogen ammonia | 4 |
| Nitrogen organic | 2 |
| Total | 6 |
| Phosphoric avail | 2 |
| Phosphoric insol | 2 |
| Total | 4 |
| Potash sulphate | 1½ |
| Potash organic | 1½ |
| Total | 3 |
| Sulphur | 1 |
| Iron sulphate | 1 |
| Copper sulphate | 1 |
| Total | 3 |

I am aware that most of these substances have been used before in fertilizer compositions but the results obtained by using these elements as fertilizers in the proportions as indicated is so pronounced that I believe I am the first to have combined all of them in a fertilizer.

Having described my invention, what I claim as new is:

A fertilizer particularly adapted for use on orange groves, lawns and flowers comprising nitrate of lime 20%, blood meal 5%, tankage 5%, fish meal 5%, cotton seed meal 5%, tobacco 2½%, sulphate of potash 5%, steamed bone meal 10%, goat or sheep guano 39½%, sulphur 1%, sulphate of iron 1%, and sulphate of copper 1%.

THEODORE KRUMM.